Patented Jan. 8, 1952

2,581,342

UNITED STATES PATENT OFFICE 2,581,342

WATER-SOLUBLE COMBINATION PRODUCTS OF GOSSYPOL AND PROTEINS

Aaron M. Altschul and Leah E. Castillon, New Orleans, La., assignors to the United States of America as represented by the Secretary of Agriculture No Drawing. Application July 11, 1950, Serial No. 173,221

9 Claims. (Cl. 260—119)

(Granted under the act of March 3, 1883, as amended April 30, 1928; 370 O. G. 757)

This invention relates to the preparation of water soluble products of gossypol by combination with materials of natural origin. Gossypol is a naturally occurring pigment of cottonseed which is present to the extent of 0.5 to 1.5 percent by weight of the kernels. This pigment is concentrated in the pigment glands of the cottonseed and comprises 35 to 50 percent of the weight of these glands. Certain solvents such as petroleum naphthas or chlorinated hydrocarbons can be used to extract the oil from flaked cottonseed kernels without materially affecting the pigment glands or removing substantial quantities of their contents. Other solvents such as alcohols, ethers, and ketones rupture the pigment glands and extract their contents with the oil present in the seed.

It has been found that oil-free cottonseed meals containing intact pigment glands are toxic when fed in certain specific amounts to certain animals such as chicks and pigs. When, however, the pigment gland contents are removed along with the oil, the resulting meal gives no evidence of any physiological toxic effects. It has been established that intact pigment glands of cottonseed are toxic to animals and considerable experimental evidence suggests that one of the principal factors contributing to the toxicity of pigment glands is the gossypol contained therein.

In the normal practice of processing cottonseed for oil and meal by the hydraulic- or continuous screw-press methods, in which heat and pressure are applied to flaked or rolled cottonseed meats, the pigment glands are ruptured and their contents react with the surrounding extraglandular materials. Whereas in raw cottonseed meats, the amount of free gossypol, that is gossypol which is readily extractable by aqueous acetone or chloroform, varies from 0.5 to 1.5 percent, very little free gossypol can be detected in hydraulic or screw-press meal. In some of the newly developed methods of processing by solvent extraction of the oil, the cottonseed meats are cooked prior to extraction in order to facilitate extraction and the oil-free flakes are cooked after extraction to detoxify them. Gossypol is also destroyed by these processes and generally cannot be detected in the oil-free meals.

If, however, the oil is extracted without application of heats by solvents which do not cause the rupture of the pigment glands or by the new method of fractionation whereby the pigment glands are separated intact from the oil and meal (pending application of Boatner, Hall, and Merrifield, Serial No. 675,118, filed June 7, 1946, now U. S. Patent No. 2,482,141, issued September 20, 1947), the gossypol remains unchanged. By use of the solvent extraction method, the gossypol is found in the oil-free meal and in the gland fractionation process, in the separated pigment glands. In either case gossypol can be recovered from the meal or pigment glands by extraction with a suitable solvent such as aqueous acetone and can be purified to yield pure crystalline material.

Gossypol is a new byproduct of processing cotton seed and can materially increase the value of cottonseed to the farmer and processor. It has been suggested that gossypol may have pharmaceutical uses and may be used as an insecticide. Biological research with this material and its application to new uses is difficult, however, because of its insolubility in water.

The object of our invention is to prepare products of gossypol which are either water-soluble or water-dispersible. We have found that gossypol may be combined with protein to form a new product which is soluble in neutral water or buffer solution to the extent of approximately 10 percent. Whereas a mixture of gossypol and water is not toxic to goldfish, a solution of the new gossypol-protein product in water in a concentration of one part to 20,000 parts of water kills goldfish in one hour.

The products of our invention and the methods for preparing these products are further illustrated but not limited by the following examples.

*Example 1.*—Ten grams of purified peanut protein was added to one liter of distilled water. The mixture was treated with dilute aqueous sodium hydroxide solution until the pH of the solution was increased to 8.5. At this pH value the protein was completely soluble. Ten grams of pure gossypol was added to this protein solution and dilute aqueous sodium hydroxide was added drop by drop until the pH of the solution was increased to 10.3 and the gossypol was solubilized. Immediately thereafter an aqueous solution of hydrochloric acid was added dropwise until the pH of the solution was reduced to 6.8 to 7.0. During the entire course of the preparation the solution was constantly agitated. The solution was then frozen and lyophilized, i. e., the water was removed from the material in the frozen state under conditions of high vacuum, low pressure, and low temperature. A yield of 20 grams of fluffy, yellow-colored, dry product was obtained. This material was soluble in water at neutral pH.

Goldfish placed in a medium containing one part of this material dissolved in 20,000 parts of water at neutral pH died within one hour. Goldfish placed in a medium containing one part of pure gossypol suspended in 1,000 parts of water at neutral pH did not die in five days.

*Example 2.*—Two-tenths of a gram of peanut protein was added to one liter of distilled water and the mixture was stirred while dilute aqueous alkali was added to dissolve the protein. To this solution was added two grams of pure gossypol and enough aqueous alkali to increase the pH of the solution to 10.3. When complete solution of both the protein and gossypol was attained, the solution was neutralized by the addition of acid under conditions of constant stirring. The neutral solution was frozen and dried by lyophilization and a yellow-colored product weighing 2.18 grams was recovered. This material was soluble in water at neutral pH and was lethal to goldfish in a concentration of 1 to 20,000 of water.

*Example 3.*—One gram of gossypol was added to a liter of one-tenth percent solution of peanut protein at pH of 8.5. By addition of more aqueous sodium hydroxide solution, the pH of the solution was increased to 10.3, thereby making the gossypol completely soluble. While the solution was constantly stirred, aqueous hydrochloric acid solution was added until the pH of the solution was lowered to 4.5, whereupon a yellow flocculent precipitate formed. The mixture was centrifuged, and the colorless aqueous supernatant solution was decanted. Fifty milliliters of distilled water was used to transfer the precipitated gossypol-protein product from centrifuge bottles into a large flask in which it was frozen and dried by lyophilization. This material was soluble in water at neutral pH and was lethal to goldfish in a dilution of 1 part to 20,000 parts of water.

*Example 4.*—Ten grams of casein was added to one liter distilled water. Aqueous sodium hydroxide solution was added dropwise until the casein was entirely dissolved. To this solution there was added 10 grams of pure gossypol and sufficient aqueous sodium hydroxide solution to increase the pH of the solution to approximately 11.0. All of the gossypol went into solution after which the pH of the solution was lowered to 7.0 by the addition of aqueous hydrochloric acid solution, and it was frozen and dried by lyophilization. This dried product was soluble in water at neutral pH and was lethal to goldfish.

The invention herein described may be manufactured and used by or for the Government of the United States of America for governmental purposes throughout the world, without the payment to us of any royalty thereon.

Having thus described our invention, what we claim is:

1. A process of preparing a water-soluble, toxic, gossypol product comprising dissolving gossypol and protein in dilute aqueous alkali, and neutralizing with acid.

2. A process of preparing a water-soluble toxic gossypol product comprising dissolving gossypol and protein in dilute aqueous alkali, neutralizing with acid, and drying by lyophilization.

3. The process of claim 1 in which the protein is peanut protein.

4. The process of claim 1 in which the protein is casein.

5. A process of preparing a water-soluble toxic gossypol product comprising dissolving protein in dilute aqueous sodium hydroxide, adding gossypol to the solution, and dissolving it by adding dilute aqueous sodium hydroxide to about pH 10.3, adding hydrochloric acid to reduce the pH to the range 6.8 to 7.0, freezing the solution and lyophilizing to obtain a dry product.

6. The process of claim 5 in which the protein is peanut protein.

7. The water-soluble toxic gossypol product produced by the process of claim 2 in which the protein is peanut protein.

8. The water-soluble toxic gossypol product produced by the process of claim 2 in which the protein is casein protein.

9. The water-soluble, toxic gossypol product produced by the process of claim 2 in which the protein is taken from the class consisting of peanut and casein protein.

AARON M. ALTSCHUL.
LEAH E. CASTILLON.

REFERENCES CITED

The following references are of record in the file of this patent:

UNITED STATES PATENTS

| Number | Name | Date |
|---|---|---|
| 2,484,831 | Hutchins | Oct. 18, 1949 |

OTHER REFERENCES

Clark: J. Biol. Chem. 76, pp. 229–234, (1928).

Murty: Chemical Abstracts 40, p. 3219 (1946).

Winton: The Structure and Composition of Foods, vol. 1, pp. 566–569, Wiley, N. Y., 1932.